United States Patent
Lund

(10) Patent No.: US 10,972,405 B2
(45) Date of Patent: Apr. 6, 2021

(54) SCALING NETWORK FUNCTIONS

(71) Applicant: Metaswitch Networks Ltd., Enfield (GB)

(72) Inventor: Christian Lund, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 13 days.

(21) Appl. No.: 16/246,244

(22) Filed: Jan. 11, 2019

(65) Prior Publication Data

US 2019/0222533 A1 Jul. 18, 2019

(30) Foreign Application Priority Data

Jan. 12, 2018 (GB) .................................. 1800565.2

(51) Int. Cl.
*H04L 12/923* (2013.01)
*H04L 12/26* (2006.01)
(Continued)

(52) U.S. Cl.
CPC ........ *H04L 47/762* (2013.01); *G06F 9/45533* (2013.01); *G06F 9/45558* (2013.01);
(Continued)

(58) Field of Classification Search
CPC ............... H04L 47/762; H04L 43/0817; H04L 41/5054; H04L 41/0896; H04L 41/5025;
(Continued)

(56) References Cited

U.S. PATENT DOCUMENTS

| 10,409,642 B1 * | 9/2019 | Tang ..................... G06F 9/5061 |
| 2009/0037922 A1 * | 2/2009 | Herington ............... G06F 9/505 |
| | | 718/104 |

(Continued)

FOREIGN PATENT DOCUMENTS

| EP | 3035619 A | 6/2016 | |
| EP | 3035619 A1 * | 6/2016 | ............. H04L 49/70 |

(Continued)

OTHER PUBLICATIONS

Krishnan et al "NFV Real-time Analytics and Orchestration Use Cases and Architectural Framework", Nov. 11, 2014, Internet Research Task Force (IRTF).

(Continued)

*Primary Examiner* — Ario Etienne
*Assistant Examiner* — Kamal Hossain
(74) *Attorney, Agent, or Firm* — Newport IP, LLC; Han Gim

(57) ABSTRACT

A method of determining trigger conditions for scaling a scalable unit of network function comprising identifying a primary set of metrics associated with usage of an instance of the unit of network function as a primary indicator of occurrence of a load state thereof, and determining usage points when the primary indicator indicates that the load state occurs. Deriving a secondary set of the metrics, different to the primary set, as a secondary indicator of occurrence of the load state of the instance at each of a group of one or more of the usage points when the primary indicator indicates that the load state occurs, and measured data corresponding to values of the metrics in the secondary set of metrics at each of the group of usage points. Storing a trigger condition for scaling the unit of network function based on the secondary set and the measured data.

17 Claims, 7 Drawing Sheets

(51) Int. Cl.
*G06F 9/50* (2006.01)
*H04L 12/24* (2006.01)
*G06F 9/455* (2018.01)

(52) U.S. Cl.
CPC ............ *G06F 9/505* (2013.01); *G06F 9/5083* (2013.01); *H04L 41/0681* (2013.01); *H04L 41/0893* (2013.01); *H04L 41/0896* (2013.01); *H04L 41/5025* (2013.01); *H04L 41/5054* (2013.01); *H04L 43/045* (2013.01); *H04L 43/062* (2013.01); *H04L 43/08* (2013.01); *H04L 43/0817* (2013.01); *H04L 43/16* (2013.01); *G06F 2009/4557* (2013.01); *G06F 2209/508* (2013.01); *G06F 2209/5019* (2013.01)

(58) Field of Classification Search
CPC . H04L 43/045; H04L 41/0681; G06F 9/5083; G06F 9/45533
See application file for complete search history.

(56) References Cited

U.S. PATENT DOCUMENTS

| | | | | |
|---|---|---|---|---|
| 2015/0113120 A1* | 4/2015 | Jacobson | ................. | G06N 5/04 709/224 |
| 2015/0149618 A1* | 5/2015 | Kodali | .................... | H04L 47/70 709/224 |
| 2016/0057034 A1* | 2/2016 | Rosier | ................. | H04L 41/0883 709/224 |
| 2016/0205519 A1* | 7/2016 | Patel | ....................... | H04W 4/08 455/518 |
| 2016/0323377 A1 | 11/2016 | Einkauf et al. | | |
| 2017/0104609 A1* | 4/2017 | McNamee | .............. | H04L 63/06 |
| 2017/0373938 A1* | 12/2017 | Raether | ............... | H04L 41/0816 |
| 2018/0287902 A1* | 4/2018 | Chitalia | .................. | H04L 12/26 |
| 2020/0213205 A1* | 7/2020 | Savoor | .................... | H04L 43/16 |

FOREIGN PATENT DOCUMENTS

WO 2016115374 A 7/2016
WO 2017019018 A1 2/2017

OTHER PUBLICATIONS

Janakiram MSV: Apache Kafka: A Primer—The New Stack, Feb. 17, 2017.
HPE OpenNFV Partner Program; OpenNFV VNF Testing—Brocade, Jun. 10, 2016.
Combined Search and Examination Report dated Feb. 27, 2018 for Application No. GB1800565.2.

* cited by examiner

| Primary metric | | Secondary metric | | | | |
|---|---|---|---|---|---|---|
| | | Memory | Network | Disk Space | Disk iops | QLen |
| CPU | 85 | 80 | 80 | | | |
| | | 70 | | | | |
| | | | | 100 | | 60 |
| | | | 85 | 50 | 95 | |
| | | | | | | 85 |

FIG. 3

SCALING NETWORK FUNCTIONS

CROSS-REFERENCE TO RELATED APPLICATIONS

This application claims the benefit under 35 U.S.C. § 119(a) and 37 CFR § 1.55 to UK patent application no. 1800565.2, filed on Jan. 12, 2018, the entire content of which is incorporated herein by reference.

BACKGROUND OF THE INVENTION

Field of the Invention

The present disclosure relates to determining trigger conditions for scaling and/or triggering scaling of a scalable unit of network function. In particular, but not exclusively, it relates to methods, network function virtualization orchestrators, network function managers, element managers, network systems and computer programs.

SUMMARY

In a first exemplary embodiment of the invention, there is provided a method of determining trigger conditions for scaling a scalable unit of network function, the method comprising: receiving metrics data corresponding to metrics associated with usage of an instance of a scalable unit of network function, the plurality of different metrics each being indicative of one or more usage characteristics associated with the instance; identifying a primary set of one or more of said metrics as a primary indicator of occurrence of a load state of the instance; determining, based on the received metrics data, usage points when the primary indicator indicates that the load state occurs; deriving, from the received metrics data: a secondary set of one or more of said metrics, different to the primary set, as a secondary indicator of occurrence of the load state of the instance at each of a group of one or more of the usage points when the primary indicator indicates that the load state occurs; and measured data corresponding to values of the metrics in the secondary set of metrics at each of the group of usage points; determining at least one criteria for predicting future values of each of the secondary set of one or more metrics, based on a current value of each of the secondary set of one or more metrics and historical data relating to a pattern of usage of the unit of network function; and storing a secondary trigger condition for scaling said unit of network function based on said predicted values of said secondary set and said measured data.

In a second exemplary embodiment of the invention there is provided a non-transitory computer-readable storage medium comprising a set of computer-readable instructions stored thereon, which, when executed by a processing system, cause the processing system to carry out a method as described above.

In a third exemplary embodiment of the invention, there is provided a method of triggering scaling of a scalable unit of network function in a communications network, the method comprising: receiving metrics data corresponding to metrics associated with usage of an instance of a scalable unit of network function, the plurality of different metrics each having dynamically varying values, wherein the metrics data comprises a primary metric which is indicative of occurrence of a load state of the instance; and triggering scaling of the instance based on the metrics data and on secondary trigger data indicative of a secondary trigger condition, relating to a secondary set of one or more of said metrics, different to the primary set, as a secondary indicator of occurrence of the load state of the instance, wherein the secondary set of one or more of said metrics comprises a predicted future value of each of the secondary set of one or more metrics, based on a current value of each of the secondary set of one or more metrics and historical data relating to a pattern of usage of the network function.

Further features will become apparent from the following description of embodiments, given by way of example only, which is made with reference to the accompanying drawings.

BRIEF DESCRIPTION OF THE DRAWINGS

FIG. 3 shows an example table depicting key performance indicators and their corresponding thresholds in relation to a scalable unit of network function in accordance with embodiments;

DETAILED DESCRIPTION OF CERTAIN INVENTIVE EMBODIMENTS

Figure 1:
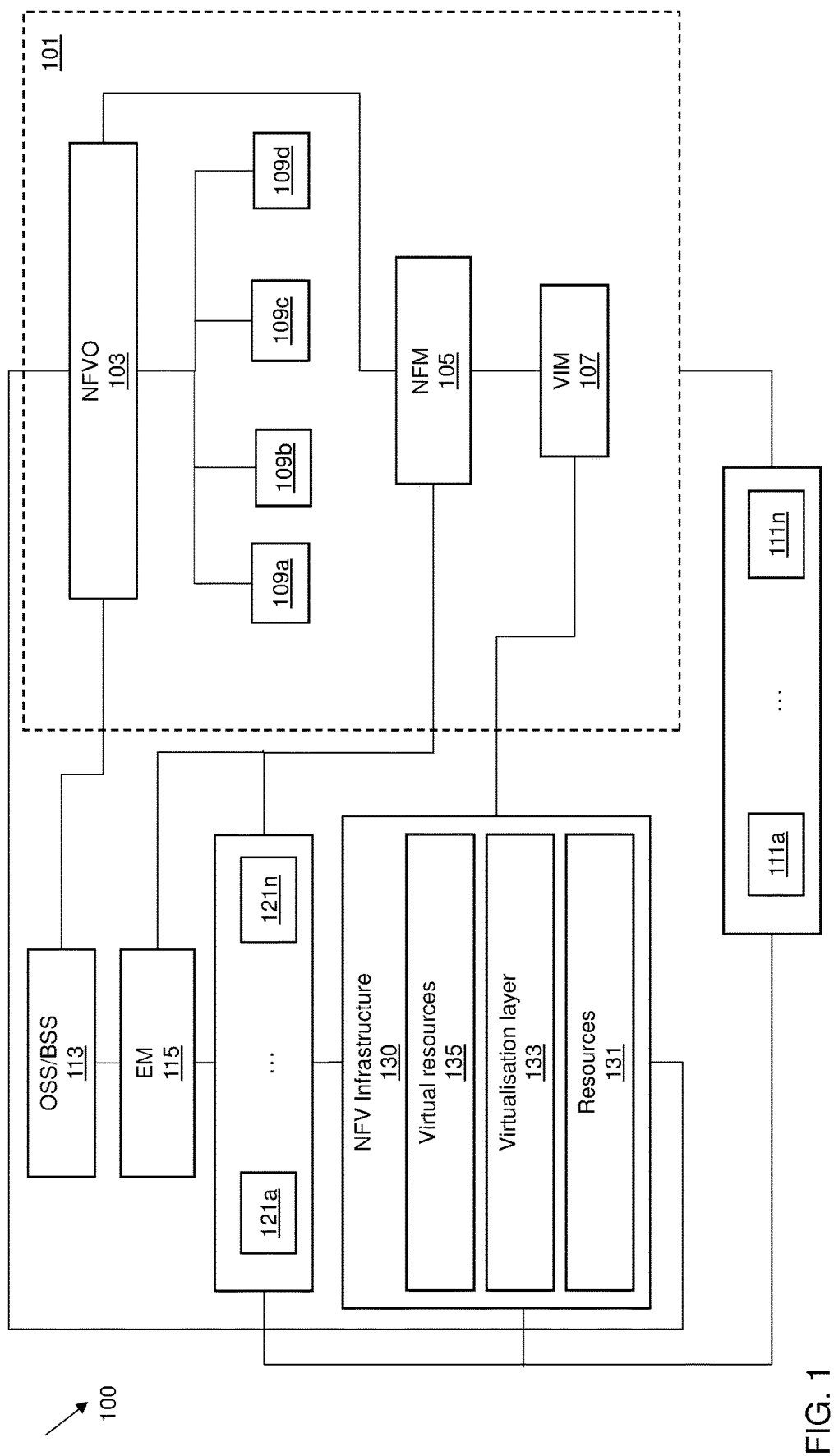
FIG. 1 shows a schematic block diagram of an example of a virtualization framework in accordance with embodiments.

Referring to FIG. 1, there is shown schematically an example of a virtualization framework 100 in a communications network (not shown) for deploying one or more scalable unit of network functions 121a-121n. The communications network comprises a number of systems. For example, the Clearwater® and MMP®, both available from Metaswitch, operate within a virtualization framework to provide an execution environment for one or more instances of the scalable unit of network functions 121a-121n. The term "system" is used herein to denote an entity (or entities) in the communications network. A system may be embodied in the form of apparatus, hardware, software, a function, a virtualized resource, etc.

The framework 100 enables provisioning of virtualized network functions. The framework 100, either alone or in combination with other systems in the communications network, facilitates provisioning of a service, such as a call handling service, between one or more end points (not shown). The end points may comprise a system in the same or another communications network and/or an end user device.

The one or more scalable unit of network functions 121 each implement all or part of functionality of a network function, such as mobility management, or a network element, such as mobility management entity (MME). The scalable unit of network function 121 may comprise a virtual network function; a microservice; a cloud based network function; a software based network function; and/or a network function as a service (NFaaS).

The framework 100 may include an element manager (EM) 115. The EM 115 may provide one or more of fault management, configuration, accounting, performance and/or security services for at least some of the scalable unit of network functions 121. The framework 100 may, additionally or alternatively, comprise an operations support system/business support system (OSS/BSS) 113 for providing operational and/or business support in respect of the scalable unit of network functions 121.

The framework 100 may comprise a network function virtualization infrastructure (NFVI) 130. The NFVI 130 may include hardware components, software components, or combinations thereof, for building a virtual environment for executing one or more instances 111*a*-111*n* of the scalable unit of network functions 121. A virtualization layer 133 abstracts resources 131, including hardware resources 131, comprising, for example, servers, storage, network and/or converged infrastructure resources, and software resources, such operating systems, application software and/or network software, and provides a virtualized resource 135 for deploying one or more of the instances 111. The virtual resources 135 may, for example, comprise a virtualized machine (VM) or a virtual container of another type. The virtualized resources 135 may be under the control of a virtualized infrastructure manager (VIM) 107, which is a part of an NFV management and orchestration (NFV-MANO) 101. The VIM 107 manages association between the virtualized resources 135 and the instances 111, and manages allocation, upgrade, release and reclamation of the virtualized resources 135 therebetween. The VIM 107 may maintain inventory of the virtual resources 135 and the resources 131 associated therewith. The VIM 107 may, additionally or alternatively, trigger performance and fault management actions in respect of the resources 131 and the virtual resources 135.

The NFV-MANO 101 may, additionally or alternatively, comprise a catalogue 109*a* maintaining a repository of all the scalable unit of network functions 121 available via the framework 100. In respect of at least some of the scalable unit network functions 121, the catalogue 109*a* may maintain a network function descriptor (NF-D) setting out KPIs and their associated thresholds for use in scaling. The NFV-MANO 101 may, additionally or alternatively, comprise a network services catalogue 109*b* comprising data indicative of at least some of the virtualized network services. The NFV-MANO 101 may, additionally or alternatively, comprise an instances catalogue 109*c* comprising data indicative of at least some of the instances 111. The NFV-MANO 101 may, additionally or alternatively, comprise a resource catalogue 109*d* comprising data indicative of at least some of the virtualized resources 135.

The network function manager (NFM) 105 manages lifecycle of the scalable unit of network function 121 by creating, maintaining and terminating the instances 111 thereof. The NFV orchestrator (NFVO) 103 may operate in conjunction with the NFM 105 to manage the scalable unit of network functions 121. Operations of the VIM 107 and the NFM 105 may be overseen by the NFVO 103, thereby maintaining an overview of resource management across the framework 100.

One or more of the instances 111 of the scalable unit of network functions 121 may be deployed using the virtualized resources 135. The instances 111 may operate independently or in conjunction with other instances of the same or another of the units of network functions 121 to provision network services.

In examples, the NFM 107 may send a request to the NFVO 103 to allocate virtualized resources, such as a VM with a specified amount of memory, a specified amount of storage, a specific operating system and a network connection, such a Local Area Network, to executing an instance of a unit of network function. In response to the request, the NFVO 103 may identify appropriate resources from the available resources 135, and prepare, for example, a VM using the identified resources via the VIM 107. The NFVO 103 may inform the NFM 105 and may update the relevant catalogues 109. The NFM 105 then creates and executes the instance 111 using the allocated resources.

In at least some examples, at least some of the scalable unit of network functions 121 may be associated with one or more KPIs with associated thresholds for use in deciding when how to scale instances thereof. The KPIs and their associated thresholds may, for example, be maintained in an NF-D associated with the scalable unit of network function 121 for use by a system, such as the EM 115, the NFVO 103 and/or the NFM 105 to assess whether or not scaling is required. In examples, scaling may involve allocating more or less resources, and/or adding or removing instances.

Figure 2:
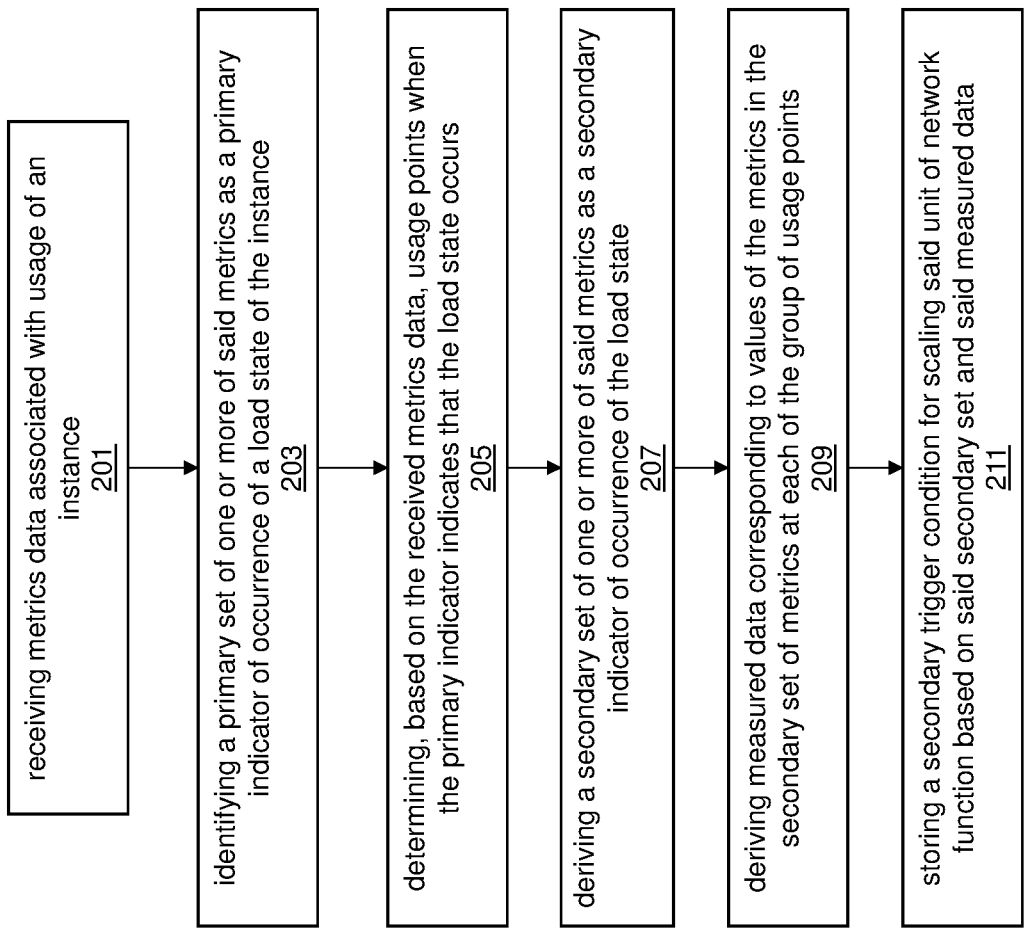
FIG. 2 shows a flow diagram depicting an example of processing data in accordance with embodiments.

Referring to FIG. 2, there is shown an example of determining one or more triggers for scaling the or another instance of the scalable unit of network function 121 in the framework described above with reference to FIG. 1.

In this example, a training system (not shown), which could for example be comprised in the EM 115, the NFVO 103, the NFM 105, and/or another system located internally or externally to the communications network and/or the framework 100, determines one or more triggers for scaling the or another instance of the scalable unit of network function 121. The training system receives metrics data corresponding to metrics associated with usage of the instance 111 of the scalable unit of network function 121 (block 201), with each of the metrics being indicative of one or more usage characteristics associated with the instance. The metrics data may, for example, include values corresponding to CPU usage, memory usage, number of disk input output operations per second (disk iops), network capacity usage and queue length (QLen). Values in relation to one of more of the metrics may dynamically vary in dependence on a load state being experienced by the instance 111. For example, the load state in relation to the instance 111 may indicate an overloaded state, an underloaded state, an under-capacity state and/or an overcapacity state.

In examples, the metrics data may correspond to historical or simulated metrics data in respect of the or another instance of the scalable unit of network function 121 for use by the training system in configuring one or more of the triggers in an offline setting, i.e. when it is not in actively communicating with the framework 100. In this case, the training system may be located remote from the framework 100. In alternate examples, the training system may be comprised in the communications network and/or the framework 100, and may be configured to receive the metrics data in an online setting, i.e. when it has a communicable coupling with the framework 100 for use in receiving metrics data and determining and/or adjusting one or more of the triggers. The metrics data may, for example, be received via a communication bus linking the training system and the framework 100, and in this case the metrics data may be provided periodically or in response to an event, such as a crash associated with the corresponding virtualized resources 135.

The training system may identify and/or be configured with a primary set of one or more of the metrics (also referred to as primary metric) as a primary indicator of occurrence of a load state of the instance 111 (block 203). For example, the received metrics, either alone or in combination with previously received metrics data, may indicate that CPU usage metric is indicative of load state being experienced by the instance 111 because value thereof is reflective of a current state associated with the instance 111. In examples, the training system may identify or it could be configured with one or more patterns based on the metrics data characteristic of one or more load states, such as an overloaded state, an underloaded state, an over-capacity state or an under-capacity state, for use in identifying the primary metric(s). The training system may, additionally or alternatively, identify and/or be configured with one or more metrics to be excluded from the primary set. For example, if the training system determines that the QLen metric is prone to falsely identifying a load state, then it may exclude the QLen metric from the primary set. In examples, the training system may incorporate machine learning techniques to identify the primary metric(s).

The training system may determine, based on the received metrics data, usage points when the primary indicator indicates that the load state occurs (block 205). The training system may determine the usage points in respect of some or all of the metrics. The training system may derive, from the metrics data received at block 201, a secondary set of one or more of said metrics (also referred to as secondary metrics), different to the primary metrics, as a secondary indicator of occurrence of the load state of the instance 111 at each of a group of one or more of the usage points when the primary metric indicates that the load state occurs (block 207). The training system may identify the secondary metric(s) and/or the usage values corresponding thereto using the aforementioned patterns and/or machine learning techniques. In examples, if the primary metric(s) comprise CPU usage metric, then the secondary metric(s) may include one or more of: disk usage; memory usage; number of disk input output operations per second (disk iops); network capacity usage; and queue length (QLen). In examples, if the primary metric(s) is indicative of an overloaded state, the secondary metric(s) may identify the cause of the overloaded state, such as call volume and/or subscriber volume, and accordingly enable relevant remedial action to be carried out. For example, if the overloaded state is due to call volume then it may be addressed by adding more resources to the same instance 111, however if the overloaded state is due to subscriber volume adding more resources may not necessarily rectify the problem and it may be more appropriate to add another instance of the unit of network function 121 to share the load.

The training system may identify which of the metrics to use as secondary metrics by identifying one or more patterns at different times when a load state, such as an overloaded state, is being experienced. The training system may use a clustering algorithm to identify metrics whose usage points have a high correlation across the identified patters, thereby defining a first group of metrics whose usage points have a similar value in the identified patterns and a second, different, group of metrics. The training system may identify one or more of the metrics from the first group as secondary metrics. The training system may repeat this process for identifying relevant secondary metrics in respect of one or more other load states. The training system may, alternatively or additionally, use an autoencoder for identify the secondary metrics, which is a neural network used in an unsupervised learning environment and that takes data corresponding to one or more of the metrics as an input and generates data identifying one or more of the secondary metrics.

The training system may derive, from the received metrics data received at block 201, measured data corresponding to values of the secondary metric(s) at each of the group of usage points, i.e. when the primary metric(s) indicates that the load state occurs (block 209). The measured data may, for example, comprise data indicative of a usage value at the instant, rate of change between two usage values, a binary value and/or a percentage indicative of capacity.

The training system may store a secondary trigger condition for scaling the scalable unit of network function 121 based on the secondary metric(s) and the measured data (block 211). The training system may store the secondary trigger condition in, for example, the NF-D corresponding to the scalable unit of network function 121 for use in relation to the same or another instance thereof.

Therefore, embodiments identify one or more primary metrics characteristic of a load state in the network, and identify one or more of different secondary identifier(s) characteristic of the underlying cause of the load state being experienced. Accordingly, embodiments enable different scaling actions to be carried out depending on the underlying cause.

In at least some examples, the group of usage points comprises a plurality of usage points at, for example, different time instances. In this case, the secondary trigger condition may comprise processing the measured data at each of said plurality of usage points to generate a threshold for use in the secondary trigger condition. In examples, the training system may select a usage value for a metric from the identified patterns, such as the highest value, and/or an average of the usage values for a metric in all the identified patterns in order to determine a threshold. In other examples, the training system may store multiple thresholds for a metric based on different of the usage values corresponding thereto from the identified patterns. The training system may add headroom to the generated threshold for robustness.

The secondary trigger condition may be based on a threshold corresponding to one of the secondary metrics, or the secondary trigger condition may be based on a threshold corresponding to a plurality of the secondary metrics. The training system may process the measured data at each of the group of usage points to generate a plurality of thresholds for each or at least some of the secondary metrics for use in the secondary trigger condition. Therefore, thresholds for use in the secondary trigger condition may be flexibly determined.

In at least some examples, the training system may, additionally or alternatively, store a primary trigger condition based on the primary metric(s) and their associated thresholds. The primary trigger condition may cause evaluation of one or more of the secondary trigger conditions associated with the particular load state being experienced, thereby enabling evaluation in respect of the relevant of the secondary trigger conditions. In examples, the primary trigger condition may be characteristic of the load state being experienced and the secondary trigger condition may be characteristics of the underlying cause for the load state being experienced.

In the example set forth in FIG. 3, a plurality of secondary trigger conditions may be stored. In this example, CPU usage is the primary metric and is associated with a threshold of 85 to indicate that if the CPU usage in respect of the instance reaches 85, then it is characteristic of an overloaded state. The training system derives, from the metrics data received at block 201, a first secondary set of one or more of the metrics, different to the primary set, as a first secondary indicator of occurrence of the load state of the instance 111 at each of a first group of one or more of the usage points when the primary indicator indicates that the load state occurs. In the example set forth in FIG. 3, from the metrics, a first secondary set comprising memory usage and network usage is defined. The training system derives first measured data corresponding to values of the metrics in the first secondary set of metrics at each of the first group of usage points, and in this case the secondary metrics of memory usage and network usage are each associated with the value 80.

The training system may derive, from the metrics data received at block 201, a second secondary set of one or more of the metrics, different to the primary set and the first secondary set, as a second secondary indicator of occurrence of the load state of the instance 111 at each of a second group of one or more of the usage points when the primary indicator indicates that the load state occurs. In the example set forth in FIG. 3, from the metrics, a second secondary set comprising memory usage and disk space is defined. The training system derives second measured data corresponding to values of the metrics in the second secondary set of metrics at each of the first group of usage points, and in this example the secondary metrics of memory usage and disk space are associated with values 70 and 100 respectively.

The training system may store a first secondary trigger condition for scaling the unit of network function 121 based on the first secondary set, comprising metrics memory usage and network usage, and the first measured data, comprising value of 100 in respect of both the metrics in the first secondary set. The training system may store a second secondary trigger condition for scaling the unit of network function 121 based on the second secondary set, comprising metrics memory usage and disk space, and the second measured data, comprising value of 70 and 100 respectively in respect of the two metrics in the second secondary set. In this example, the first trigger condition may be characteristic of an overloaded state due to lack of allocation of required resources, and the second trigger condition may be characteristic of overloaded state due to a sudden spike in data processing operations.

In this example, the training system derives a third secondary set comprising QLen with an associated third measured data comprising value 60, a fourth secondary set comprising disk space and disk iops with an associated fourth measured data comprising values 50 and 95 respectively, and a fifth secondary set comprising network usage and QLen with an associated fifth measured data comprising values 85 each. The training system may store one or more further secondary trigger conditions based on one or more of the third, fourth and fifth secondary sets and the measured data associated therewith.

In at least some examples, the training system may store the first secondary trigger condition by processing the first measured data for each or the common metric at each of the first group of usage points to generate a first threshold for use in the first secondary trigger condition, and store the second secondary trigger condition by processing the second measured data for each or the common metric at each of the second group of usage points to generate a second threshold for use in the second secondary trigger condition. In case the first and second secondary sets comprise one or more common metrics, the first and second secondary trigger conditions may be associated with different threshold in relation to the common metric(s). In the example, set forth in FIG. 3, memory usage is common metric between the first secondary set and the second secondary set, but has different thresholds in the first and second trigger conditions respectively.

In examples, one or more of secondary sets may not comprise any common metrics, as is the case in the example set forth in FIG. 3, where the first secondary set comprising memory usage and network usage metrics does not share any common metrics with the third secondary set comprising QLen metric and the fourth secondary set comprising disk space and disk iops metrics. Therefore, embodiments enable trigger conditions to be flexibly defined by selecting relevant of the secondary metrics.

In examples, the training system may use machine learning techniques and/or a neural network to perform the steps of identifying at block 203, determining at block 205, deriving at block 207 and deriving at block 209. The machine learning techniques or neural network may require human involvement initially, for example, to learn distinction between various load states associated with the instance 111, but subsequently will be able to operate with little or no human input.

Figure 4A:
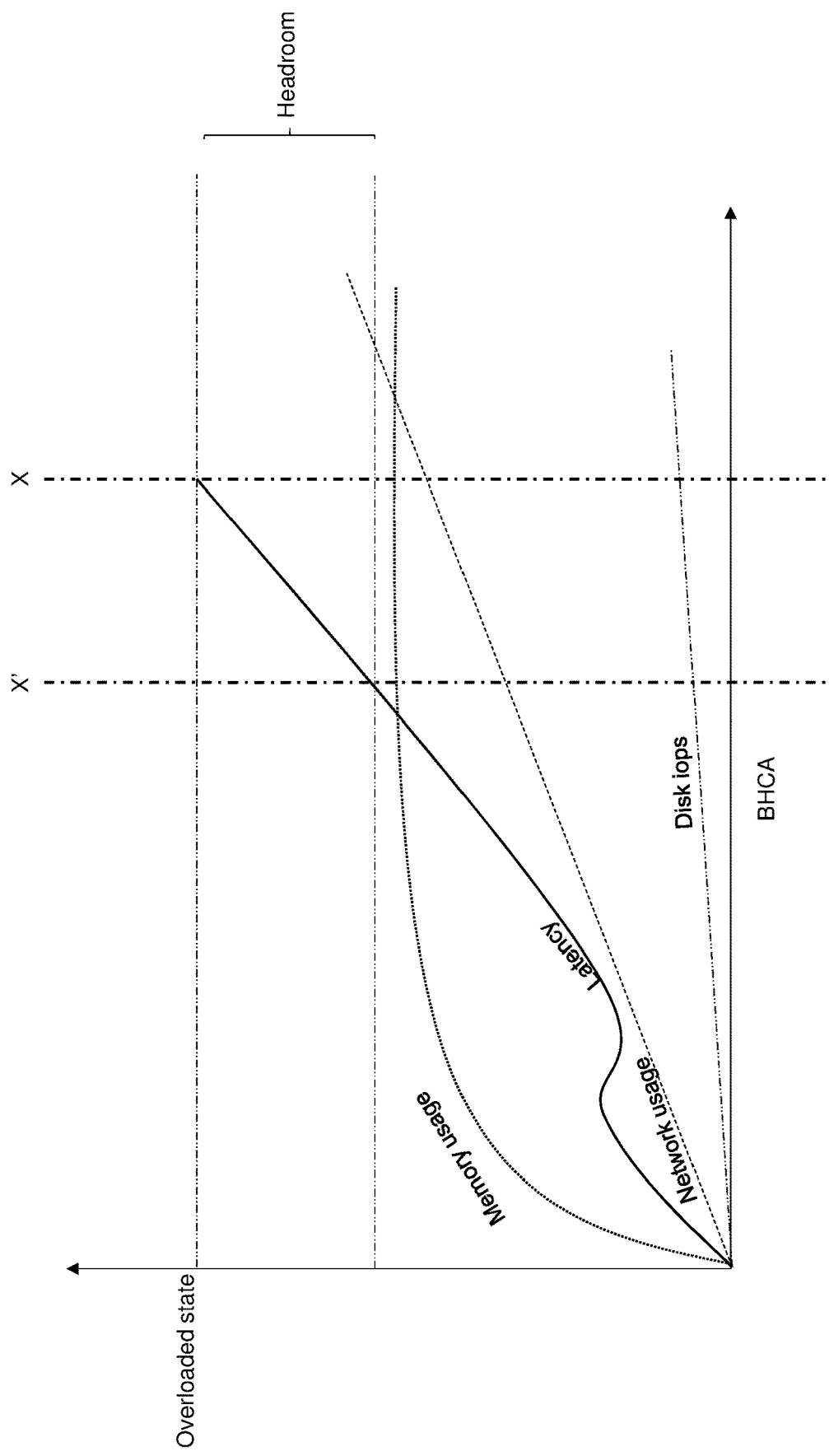
FIGS. 4a-4c show example plots depicting key performance indicators of a scalable unit of network function in accordance with embodiments.
Figure 4B:
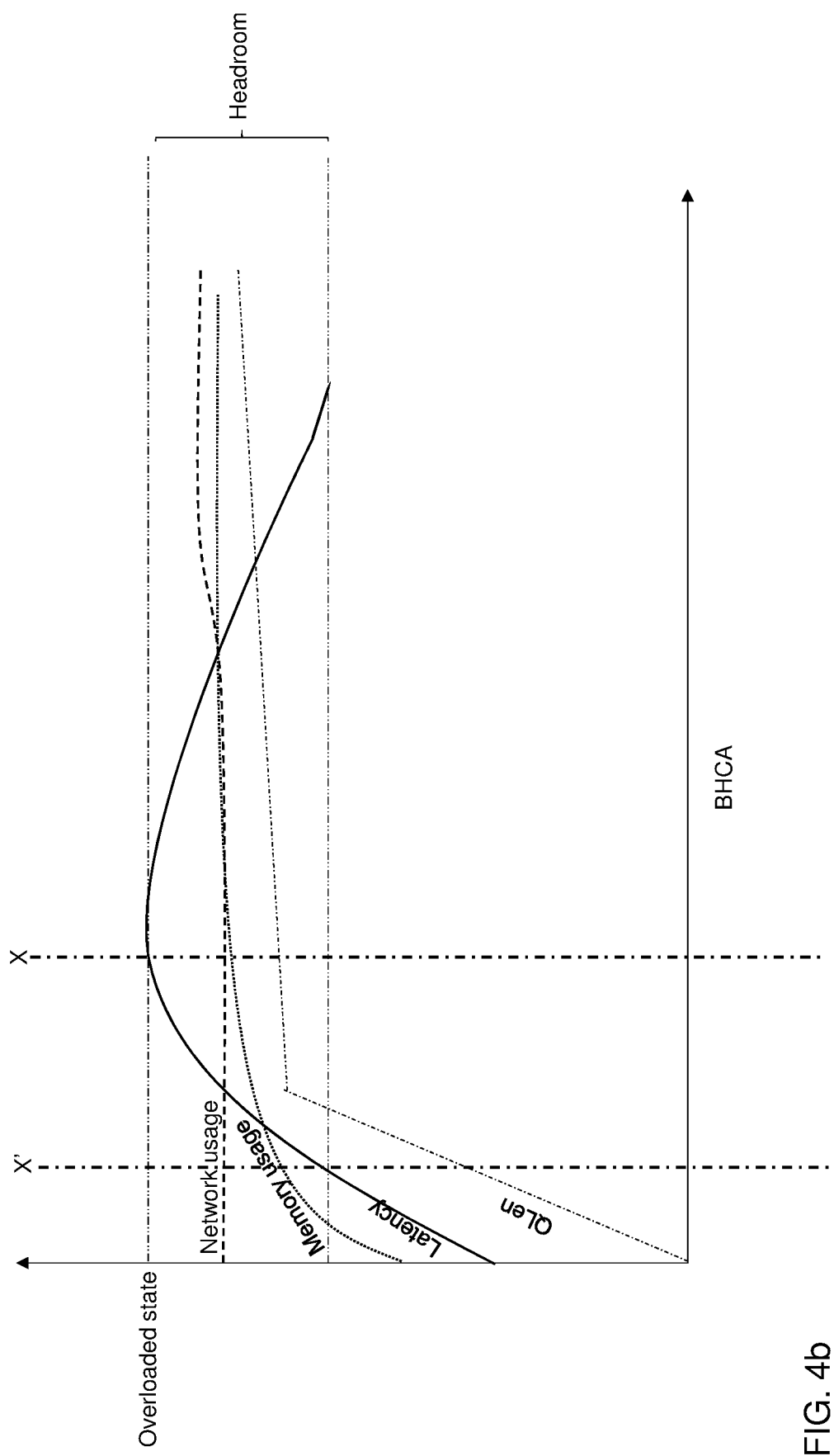
Figure 4C:
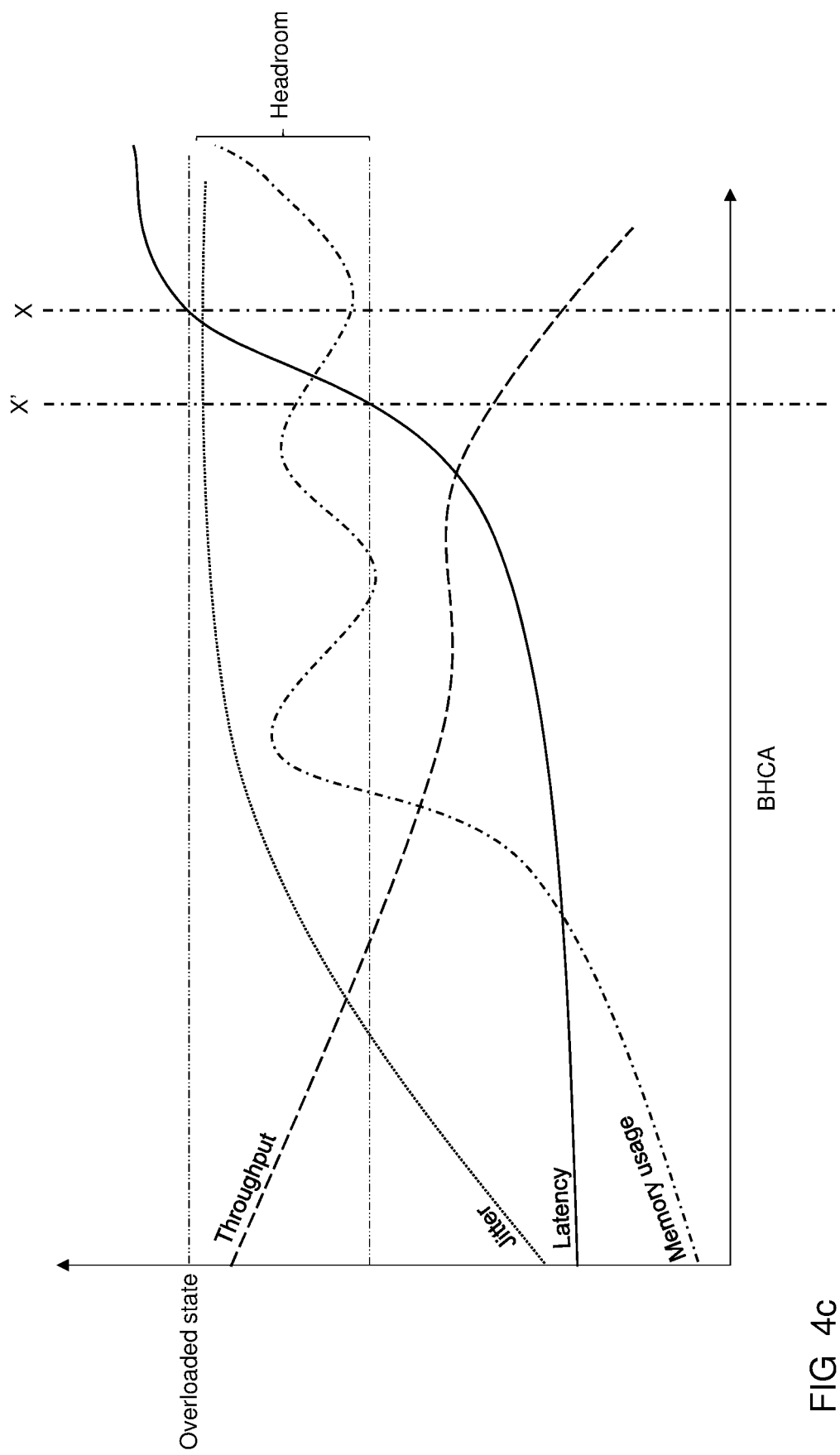

In the example set forth in FIGS. 4a-4c, data corresponding to some of the metrics associated with usage of the instance 111 is plotted against busy hour call attempts (BHCA). In this example, latency is the primary metric, and when usage value thereof reaches a specific level (represented by a dotted line with the label "Overloaded state" in the FIGS. 4a-4c) the load state associated with the instance 111 is an overloaded state. The training system may determine a usage point when the primary metric, i.e. latency, indicates that the overloaded state occurs, i.e. when a usage value thereof is overlaps with a point on the dotted line characteristic of the overloaded state. The training system may add a headroom to the determined usage point at which the primary metric latency indicates that the overloaded state occurs, whereby providing an early indication that the instance 111 may potentially be in the overloaded state for pre-emptively scaling. The training system may determine an optimum headroom using machine learning techniques and/or using a neural network. The training system may customize headroom depending on, for example, service level agreements, accepted quality of service, etc.

In the first of the examples set out in FIG. 4a, the memory usage metric rises sharply but then flattens out, and may be a secondary indicator of occurrence of the overloaded state. The network usage metric also rises linearly, and may also be a secondary indicator of occurrence of the overloaded state. The intersection between the dotted line with the label "Overloaded state" and the network usage metric may not necessarily be characteristic of an overloaded state in respect of the instance 111 because the dotted line with the label "Overloaded state" is relative to the primary metric, i.e. the latency metric in this example. The metric disk iops rises gradually but not significantly, and accordingly may not be considered as secondary indicator of occurrence of the overloaded state. The training system may, therefore, derive a secondary set comprising the memory usage and network usage metrics, and derive measured data corresponding to values of these secondary metrics at usage points when the primary metric latency indicates that the overloaded state occurs (or the overloaded state as adjusted by the headroom). In this example, the training system may store the secondary trigger condition based on measured data along the dotted line labelled X in respect of the secondary metrics network usage and memory usage, or measured data along the dotted line labelled X' when accounting for headroom.

In the example set forth in FIG. 4b, the instance 111 may experience a sudden spike in call volume causing the primary metric latency to rise sharply. The sudden spike may also cause the QLen metric to rise sharply, a spike in the memory usage metric and a high usage value in respect of the network usage metric. The training system may, therefore, derive a secondary set comprising the memory usage, network usage and QLen metrics, and derive measured data corresponding to values of the metrics in the secondary set at usage points when the primary metric latency indicates that the overloaded state occurs (or the overloaded state as adjusted by the headroom). In this example, the training system may store the secondary trigger condition based on measured data along the dotted line labelled X in respect of the secondary metrics memory usage, network usage and QLen, or measured data along the dotted line labelled X' when accounting for headroom.

In the example set forth in FIG. 4c, the instance 111 may be in an overloaded state due to downstream congestion, which may cause a sudden rise in the latency, jitter and memory usage metrics, whereas a fall in the throughput metric. The training system may, therefore, derive a secondary set comprising the memory usage, throughput and jitter metrics, and derive measured data corresponding to values of the metrics in the secondary set at usage points when the primary metric latency indicates that the overloaded state occurs (or the overloaded state as adjusted by the headroom). In this example, the training system may store the secondary trigger condition based on measured data along the dotted line labelled X in respect of the secondary metrics memory usage, throughput and jitter, or measured data along the dotted line labelled X' when accounting for headroom.

In at least some examples, the training system may determine a traffic profile associated with the instance 111 or another instance of the unit of network function 121. The traffic profile comprises data indicative of one or more types of network traffic being directed or expected to be directed to the instance 111. The training system may store the secondary trigger condition for scaling the unit of network function based on the determined traffic profile, thereby scaling operation to be tailored in accordance with the traffic classes.

The training system may, additionally or alternatively, identify volumes associated with different traffic types at different time instants. For example, 80% of the traffic directed to the instance 111 between 5-7 pm may relate to voice calls, whereas between 11 pm-1 am 80% of the traffic directed to the instance 111 may be SMS. In this case, scaling via the various trigger conditions may be handled differently at different time instants based on the type of traffic being or expected to be handled by the same or another instance of the unit of network function 121.

The training system may, additionally or alternatively, determine at least one criteria for predicting future values of each of the secondary metric(s), based on a current usage value associated with the secondary metric(s) and historical data relating to a pattern of usage associated with instances of the unit of network function 121. The pattern of usage may, for example, be derived from the received metrics data and/or the traffic profile.

In at least some examples, the training system may receive further metrics data associated with usage of the same or another instance of the unit of network function 121. The training system may, for example, adjust the one or more secondary trigger conditions based on the further metrics data, which may involve, for example, adjusting one or more of the thresholds corresponding to one or more of the relevant secondary metrics. The training system may, additionally or alternatively, store one or more further secondary trigger conditions based on the further metrics data. Therefore, the training system continually optimizes the secondary trigger conditions and/or identifies further trigger conditions.

In at least some examples, the training system may normalize the metrics data received at block 201, for example, using heuristics to identify potentially random spikes or erroneous usage values in respect of one or more of the primary and/or the secondary metrics.

Figure 5:
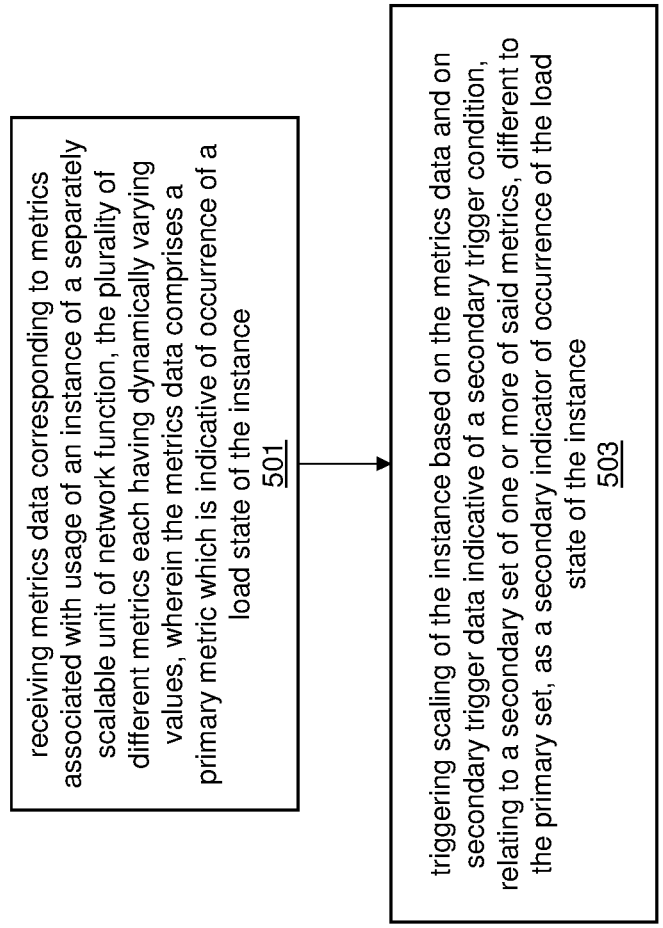
FIG. 5 shows a flow diagram depicting another example of processing data in accordance with embodiments.

In the example set forth in FIG. 5, a scaling system (not shown), which could for example be comprised in the EM 115, the NFVO 103, the NFM 105, and/or another system located internally or externally to the communications network and/or the framework 100, scales one or more instances of the scalable unit of network function 121. The scaling system may operate independently of or in conjunction with the training system.

The scaling system receives metrics data corresponding to metrics associated with usage of the instance 111 of the unit of network function 121 (block 501). The metrics data comprises one or more of the primary metrics which are indicative of occurrence of the load state of the instance 111. For example, the primary metrics may comprise a CPU usage metric.

The scaling system may trigger scaling of the instance 111 based on the metrics data and on secondary trigger data indicative of one or more the secondary trigger conditions (block 703). Therefore, embodiments identify a load state based on one or more of the primary metrics, and use one or more of the secondary metrics to scale in accordance with the underlying cause associated with the load state being experienced.

In at least some examples, the scaling system predicts a future value of each of the secondary metric(s), based on a current value of each of the secondary metric(s) and historical data relating to a pattern of usage of the unit of network function 121. Therefore, embodiments predict likelihood of a future scaling requirement by predicting future values in respect of the secondary metric(s), and pre-emptively scaling based on the predicted values.

In at least some examples, different primary metrics may be associated with different load states. For example, CPU usage metric may be associated as a primary metric indicative of an overloaded and/or an underloaded state, whereas metric QLen may be associated as a primary metric indicative of an overcapacity and/or an under-capacity state.

In at least some examples, the scaling system triggers scaling based on a plurality of secondary trigger conditions, as described in the example set forth in FIG. 3, where the training system stored five different secondary scaling triggers. For example, first secondary trigger data indicative of a first secondary trigger condition may comprise memory usage and network usage metrics, whereas second secondary trigger data indicative of a second secondary trigger condition may comprise disk space and disk iops metrics. In this case, the second secondary set is different to the primary set and the first secondary set. In examples, the first and second secondary sets may comprise a common metric, but with different thresholds in the corresponding first and second secondary trigger conditions. In alternative examples, the first and second secondary sets may not comprise any common metrics.

In at least some examples, the scaling system, either alone or in conjunction with the training system, may adjust the one or more secondary trigger conditions based on the metrics data received at block 501, thereby continually optimizing the stored triggers. The scaling system may, additionally or alternatively, either alone or in conjunction with the training system, store one or more further secondary trigger conditions based on the metrics data received at block 501, thereby identifying further conditions for scaling in order to make the scaling robust.

In at least some examples, at least some of the secondary trigger conditions comprise a threshold corresponding to each or at least some of the metrics in the corresponding secondary set. In this case, the secondary trigger condition may trigger scaling: if one of the thresholds in relation to one of the secondary metrics is reached; if at least some of the thresholds corresponding to some of the secondary metrics are reached; or if all of the thresholds corresponding to all of the secondary metrics are reached.

In at least some examples, the scaling system may be configured with a fallback scaling condition when none of the secondary trigger conditions are activated in order to guard against unidentified conditions requiring scaling. The scaling system may identify based on the primary metric(s) that there is a certain load state, but that none of the secondary trigger conditions are applicable. In this case, the scaling system may scale in accordance with the fallback scaling condition.

The thresholds may, for example, be maintained in the NF-D corresponding to the unit of network function 121, thereby ensuring compatibility with legacy systems.

In at least some examples, in the event that the load state is indicative of an overload, the scaling system may cause allocation of more resources to the instance 111. The scaling system may, for example, request the NFVO 103 for resources, which, either alone or in conjunction with the EM 115 and/or the NFM 105, may cause allocation of more virtualized resources 135. In the event that the load state is indicative of an underload, the scaling system may cause deallocation of some of the allocated resources to the instance 111, thereby freeing up resources for use by other instances of the same or different unit of network functions 121. In the event that the load state is indicative of an overcapacity, the scaling system may cause another instance of the unit of network function 121 to be created to share the load with the instance 111. In the event that the load state is indicative of an under capacity, the scaling system may cause one or more instances of the unit of network function 121 to be terminated, thereby freeing up resources for use by other instances of the same or different unit of network functions 121.

In at least some examples, the scaling system may trigger scaling based on the aforementioned traffic profile associated with the instance 111 and/or the unit of network function 121, thereby tailoring scaling in accordance with the traffic classes directed to the instance 111. For example, allocating more disk space to a store-and-forward service may be an appropriate scaling action, but that may not resolve an overload in respect of a voice communication service, which may, for example, require more network resources to be able to maintain latency at an acceptable level.

In at least some examples, the scaling system may normalize the metrics data received at block 701, and thereafter perform the step at block 703, thereby avoiding unnecessary scaling due to a random spike in one or more usage values corresponding to one or more of the relevant primary and/or secondary metric(s).

It should be understood that the training system and the scaling system discussed above will be implemented using computer executable code deployed and executed on a general purpose computing apparatus. Such a computing apparatus will comprise at least one processor, at least one memory and at least one data storage unit. The training system and the scaling system may be deployed on different computing apparatus or, in an alternative, the same computing apparatus may be used to implement both the training system and the scaling system. The computing apparatus used to implement the training system may also perform other network functionality. For example, the training system may be implemented by a network function virtualization orchestrator, a network function manager, an element manager or another network apparatus or system. Similarly, the scaling system may be implemented by a network function virtualization orchestrator, a network function manager, an element manager or another network apparatus or system. The training system and/or the scaling system might be performed by a single apparatus or the functionality of the training system and/or the scaling system might be distrusted across a number of different apparatuses within a network. As the present invention can be implemented on software within a conventional computing apparatus, computer code may be accessed via download, for example via the internet from an ISP, or on some physical media, for example, DVD, CD-ROM, USB memory stick, etc. for which the apparatus has an appropriate media reader.

The above are to be understood as illustrative examples. Further examples are envisaged.

In examples described above, the framework 100 comprises an OSS/BSS, an EM, one or more units of network functions, an NFVI, one or more instances of one or more units of network functions and an NFV-MANO. In other examples, the framework 100 comprises further and/or different systems.

In examples described above, the NFV-MANO 101 comprises an NFVO, one or more catalogues, an NFM and a VIM. In other examples, the NFV-MANO 101 comprises further and/or different systems.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of determining trigger conditions for scaling a scalable unit of network function, the method comprising:
receiving metrics data corresponding to a plurality of different metrics associated with usage of an instance of a scalable unit of network function, the plurality of different metrics each being indicative of one or more usage characteristics associated with the instance;
identifying a primary set of one or more of said metrics as a primary indicator of occurrence of a load state of the instance;
determining, based on the received metrics data, usage points when the primary indicator indicates that the load state occurs;
deriving, from the received metrics data:
a secondary set of one or more of said metrics, different to the primary set, as a secondary indicator of occurrence of the load state of the instance, at each of a group of one or more of the usage points when the primary indicator indicates that the load state occurs;
a group of one or more headroom-adjusted usage points by adding a headroom to each of the group of one or more of the usage points when the primary indicator indicates that the load state occurs; and
measured data corresponding to one or more values of the one or more metrics in the secondary set of one or more metrics at each of the group of one or more headroom-adjusted usage points;
determining at least one criterion for predicting future values of each of the secondary set of one or more metrics, based on a current value of each of the secondary set of one or more metrics and historical data relating to a pattern of usage of the unit of network function;
determining a traffic profile associated with the instance, the traffic profile comprising data indicative of one or more types of network traffic being directed to the instance; and
storing a secondary trigger condition for scaling said unit of network function based on the determined traffic profile and said predicted values of said secondary set and said measured data.

2. The method of claim 1, wherein the group of one or more usage points comprises a plurality of usage points, and wherein storing the secondary trigger condition comprises processing the measured data at each of said plurality of usage points to generate a threshold for use in the secondary trigger condition.

3. The method of claim 1, wherein the secondary set comprises a plurality of metrics, and wherein storing the secondary trigger condition comprises processing the measured data at each of the group of one or more usage points to generate a plurality of thresholds, for each of the plurality of metrics respectively, for use in the secondary trigger condition.

4. The method of claim 1, wherein the method further comprises:
deriving, from the received metrics data:
a first secondary set of one or more of said metrics, different to the primary set, as a first secondary indicator of occurrence of the load state of the instance at each of a first group of one or more of the usage points when the primary indicator indicates that the load state occurs;
first measured data corresponding to values of the metrics in the first secondary set of metrics at each of the first group of usage points;
a second secondary set of one or more of said metrics, different to the primary set and the first secondary set, as a second secondary indicator of occurrence of the load state of the instance at each of a second group of one or more of the usage points when the primary indicator indicates that the load state occurs; and
second measured data corresponding to values of the metrics in the second secondary set of metrics at each of the second group of usage points; and
storing a first secondary trigger condition for scaling said unit of network function based on said first secondary set and said first measured data, and a second secondary trigger condition for scaling said unit of network function based on said second secondary set and said second measured data.

5. The method of claim 4, wherein the first secondary set comprises a first metric and the second secondary set also comprises the first metric,
storing the first secondary trigger condition comprises processing the first measured data for the first metric at each of the first group of usage points to generate a first threshold for use in the first secondary trigger condition; and
storing the second secondary trigger condition comprises processing the second measured data for the first metric at each of the second group of usage points to generate a second threshold for use in the second secondary trigger condition, and
wherein the first and second thresholds are different in the first and second trigger conditions respectively.

6. The method of claim 1, wherein the method further comprises:
receiving further metrics data corresponding to the metrics associated with usage of the instance; and
adjusting the secondary trigger condition based on the received further metrics data.

7. The method of claim 1, wherein the method further comprises:
receiving further metrics data corresponding to the metrics associated with usage of the instance; and
storing a further secondary trigger condition based on the received further metrics data.

8. The method of claim 1, wherein the scalable unit of network function comprises: a virtual network function; a microservice; a cloud based network function; a software based network function; and/or a network function as a service.

9. A non-transitory computer-readable storage medium comprising a set of computer-readable instructions stored thereon, which, when executed by a processing system, cause the processing system to carry out a method according to claim 1.

10. A method of triggering scaling of a scalable unit of network function in a communications network, the method comprising:
receiving metrics data corresponding to a plurality of different metrics associated with usage of an instance of a scalable unit of network function, the plurality of different metrics each having dynamically varying values, wherein the metrics data comprises a primary metric which is indicative of occurrence of a load state of the instance;
determining a traffic profile associated with the instance, the traffic profile comprising data indicative of one or more types of network traffic being directed to the instance; and
triggering scaling of the instance based on the determined traffic profile, the metrics data and on secondary trigger data indicative of a secondary trigger condition, relating to a secondary set of one or more of said metrics, different to the primary set, as a secondary indicator of occurrence of the load state of the instance, wherein the secondary set of one or more of said metrics comprises a predicted future value of each of the secondary set of one or more metrics, based on a current value of each of the secondary set of one or more metrics and historical data relating to a pattern of usage of the network function,
wherein the secondary trigger condition comprises a threshold corresponding to each of the one or more of said metrics in the secondary set, wherein the threshold is a headroom-adjusted threshold, the headroom-adjusted threshold having been derived by a headroom having been added to a generated threshold.

11. The method of claim 10, wherein the method further comprises:
triggering scaling of the instance based on the metrics data and on further trigger data indicative of a further trigger condition, relating to a further set of one or more of said metrics, different to the secondary set and including said primary metric, as a further indicator of occurrence of the load state of the instance.

12. The method of claim 10, wherein the secondary trigger data comprises:

first secondary trigger data indicative of a first secondary trigger condition, relating to a first secondary set of one or more of said metrics, different to the primary set, as a first secondary indicator of occurrence of the load state of the instance; and second secondary trigger data indicative of a second secondary trigger condition, relating to a second secondary set of one or more of said metrics, different to the primary set and the first secondary set, as a second secondary indicator of occurrence of the load state of the instance.

13. The method of claim 12, wherein the first secondary set comprises a first metric and the second secondary set also comprises the first metric, wherein the first secondary trigger data comprise a first threshold relating to the first metric and the second secondary trigger data comprise a second threshold relating to the first metric, and wherein the first and second thresholds are different.

14. The method of claim 10, wherein the method comprises: adjusting the secondary trigger condition based on the received metrics data.

15. The method of claim 10, wherein the method comprises: storing a further secondary trigger condition based on the received metrics data.

16. The method of claim 10, wherein the method comprises:

normalizing the received metrics data, and thereafter performing the step of triggering scaling of the instance.

17. The method of claim 10, wherein the scalable unit of network function comprises: a virtual network function; a microservice; a cloud based network function; a software based network function; and/or a network function as a service.

* * * * *